United States Patent
Gulich et al.

[11] Patent Number: 5,853,220
[45] Date of Patent: Dec. 29, 1998

[54] ARMREST FOR A MOTOR VEHICLE SEAT HAVING A STORAGE COMPARTMENT FOR AN ACCESSORY

[75] Inventors: Reiner Gulich, Wolfsburg; Bert Junige, Hillerse; Georg Eisner, Isenbüttel; Horst Schicht, Gifhorn, all of Germany

[73] Assignee: Volkswagen AG, Wolfsburg, Germany

[21] Appl. No.: 970,276

[22] Filed: Nov. 14, 1997

[30] Foreign Application Priority Data

Nov. 14, 1996 [DE] Germany .................. 196 46 989.9

[51] Int. Cl.⁶ .................................................. A47C 7/62
[52] U.S. Cl. .................. 297/188.16; 297/188.19
[58] Field of Search ................ 297/188.14, 188.15, 297/188.16, 188.17, 188.19, 188.21, 188.01, 411.2, 411.3, 411.32, 411.35, 411.38; 224/275, 400, 281, 282, 549; 248/118

[56] References Cited

U.S. PATENT DOCUMENTS

| | | |
|---|---|---|
| 4,509,097 | 4/1985 | Robinson . |
| 4,759,584 | 7/1988 | Dykstra et al. . |
| 5,316,369 | 5/1994 | Kanda . |
| 5,337,676 | 8/1994 | Ahad . |
| 5,375,805 | 12/1994 | Sudale et al. . |
| 5,516,191 | 5/1996 | McKee . |
| 5,556,017 | 9/1996 | Troy . |

FOREIGN PATENT DOCUMENTS

| | | |
|---|---|---|
| 3700614 | 7/1988 | Germany . |
| 4428886 | 2/1996 | Germany . |

*Primary Examiner*—Milton Nelson, Jr.
*Attorney, Agent, or Firm*—Baker & Botts, L.L.P.

[57] ABSTRACT

An armrest for motor vehicle seats has an armrest body with a storage compartment and a cover which constitutes an arm support and is articulated on the armrest body. A receptacle for an accessory such as a telephone is disposed in the storage compartment and a mechanism is provided for moving the receptacle from the storage position to the use position. To provide improved ergonomics the receptacle is supported by two pairs of links in the base region of the storage compartment and, when the cover is open, it can be pivoted by the links from a storage position in the vicinity of the base into an operating position above the armrest body. The carriage has an extension arm by which the accessory can be moved into a predetermined use position.

13 Claims, 5 Drawing Sheets

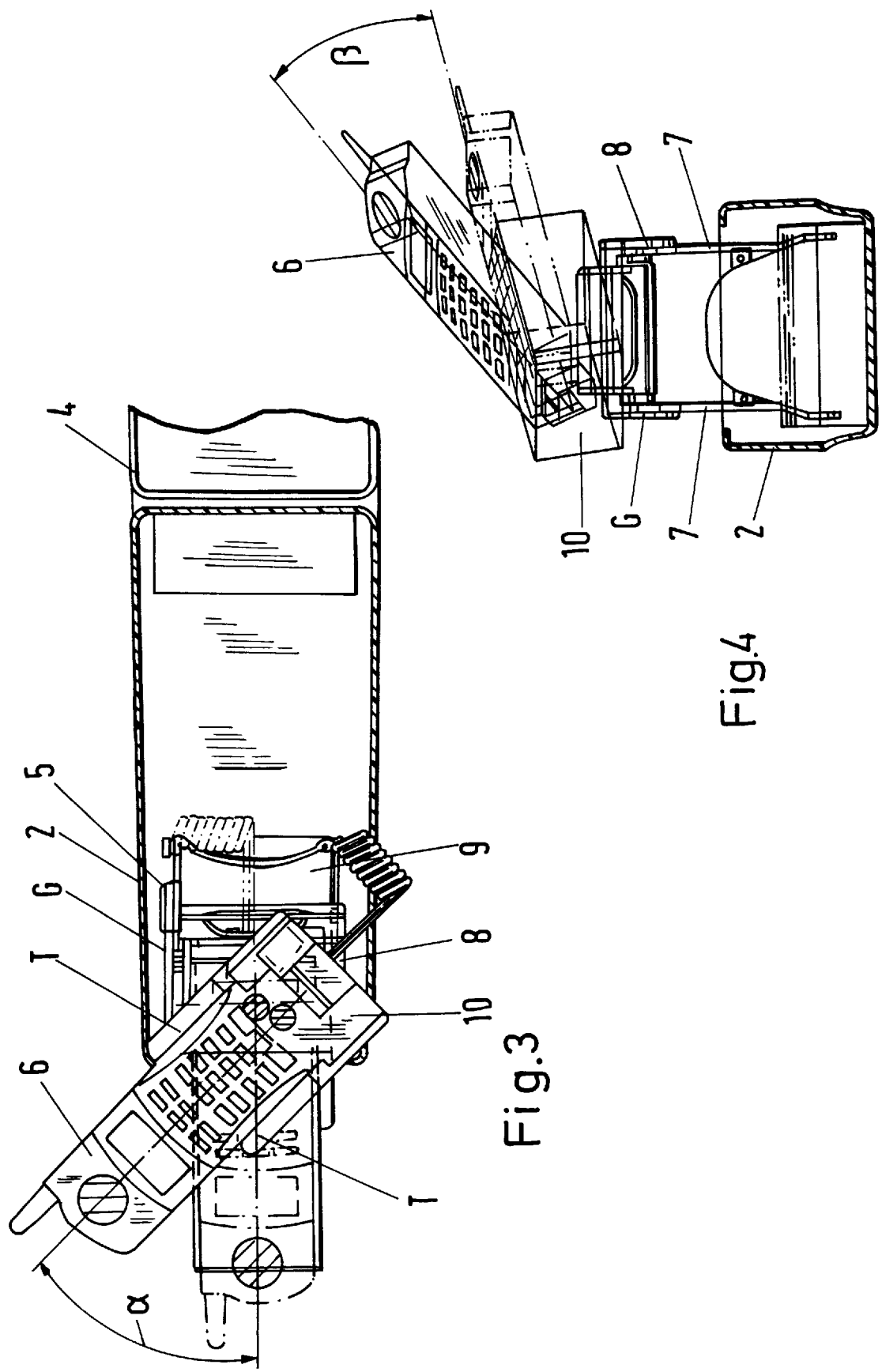

ARMREST FOR A MOTOR VEHICLE SEAT HAVING A STORAGE COMPARTMENT FOR AN ACCESSORY

BACKGROUND OF THE INVENTION

This invention relates to armrests for motor vehicles having a storage compartment for an accessory such as a telephone which is mounted between the front seats of the vehicle.

Armrests having a storage compartment are known. For example, German Offenlegungsschrifft No. DE-A 37 00 614 discloses a telephone-containing armrest for passenger vehicles having a housing which receives a telephone and a cover which is articulated on the housing. In that armrest, in order to permit for trouble-free and thus safe handling of card-actuated motor-vehicle telephones while driving, a lifting platform which receives the telephone is provided in the housing. In a preferred embodiment, this platform is articulated, transversely with respect to the longitudinal axis of the vehicle along one of its edges, in the region of the housing base. The platform is urged by a spring in the direction of the housing opening and, after release of a restraining device the platform can be pivoted around the platform pivot axis between a bottom storage position and an upper use position. The telephone, which is affixed to the lifting platform, can be pivoted, along with the lifting platform, at least partially out of the housing into the use position, so that a slot for the insertion of the card is exposed and the telephone can be used.

It is also known to use a four-bar link mechanism to mount a lifting platform in a storage compartment in an armrest having a cover. This mechanism moves the lifting platform into an upper use position.

German Offenlegungsschrifft No. DE 44 28 886 discloses an armrest for motor-vehicle seats having a cavity to receive a telephone unit. The cavity can be closed by a cover which can be pivoted around a pivot pin. In order to allow use of the telephone with a relatively simple design for the armrest, and especially to facilitate operation and to support the telephone in an ergonomically favorable operating position the telephone is mounted on the inner surface of the cover and, by pivoting the cover open around a pivot pin, the telephone can be pivoted out of the cavity into an operating position. The pivot pin is advantageously arranged at the top of the free end of the armrest body transversely with respect to the longitudinal axis of the armrest body and thus also transversely with respect to the longitudinal axis of the vehicle so that the cover can be swung open forwardly in the direction of vehicle travel.

It is also possible to use a telephone positioning arrangement for another kind of accessory in place of a telephone.

Conventional armrests have the disadvantage that the user of a telephone which is in the use position, the user usually being the driver, still has to pay too much attention to the handling and use of the telephone whenever he wants to have a telephone conversation.

SUMMARY OF THE INVENTION

Accordingly it is an object of the present invention to provide an armrest for a vehicle seat having a storage compartment for an accessory which overcomes disadvantages of the prior art.

Another object of the invention is to provide an armrest for a motor vehicle seat, having a storage compartment for an accessory, in which the use position of the accessory, which is located outside the storage compartment, is improved in terms of ergonomics.

These and other objects of the invention are attained by providing an armrest having an armrest body with a storage compartment and a cover which provides an arm support and is articulated on the armrest body, and a receptacle in the storage compartment for supporting an accessory such as a telephone, along with a mechanism for actuating the receptacle. According to the invention, the receptacle is supported by links in the base region of the storage compartment and, when the cover is open, the receptacle can be pivoted by the links between a storage position, in the vicinity of the base and an operating position above the armrest body. The receptacle is equipped with an extension arm by which the accessory can be moved, in one or more steps, from the operating position into a predetermined use position.

The receptacle may have a base plate which extends essentially parallel to the base of the storage compartment and is supported by two pairs of links, arranged one behind the other in the longitudinal direction of the vehicle, the links in each pair being spaced apart transversely with respect to the longitudinal axis of the armrest body, thereby providing a four-point support arrangement.

The links may be designed so that the operating position and the storage position of the base plate are located in essentially parallel planes. However, they may also be configured so that, in the operating position, the base plate is positioned obliquely with respect to the storage position.

An extension arm, on which the accessory is mounted, includes a carriage which is supported on the base plate, so that it can be displaced in the longitudinal direction of the armrest. This extension arm may be designed in different ways.

In a first embodiment of the invention, the carriage is arranged so that, in the operating position of the receptacle it can be moved between an initial position, which corresponds to the position of the carriage on the receptacle in the storage position, and a predetermined use position. In the use position, the carriage is displaced forwardly with respect to the receptacle and is turned and inclined toward the user.

Preferably, the receptacle has an electric motor which controls either the entire movement sequence of the accessory from the storage position into its use position or only the operation during which the receptacle pivots out of the storage compartment into the operating position. In the latter case, the carriage can be moved by spring force, the carriage being urged into the initial position by a spring and retained by a locking mechanism. In order that the carriage can be displaced, turned and inclined into the use position on the user's side, it may have a pivot bearing with a torsion spring on the bearing pin. For the purpose of unlocking the carriage, an unlocking button is provided.

After use, the accessory, along with the carriage, is pressed manually into the locking position again, locking taking place automatically when the carriage is in this position.

In a second embodiment, the carriage has a bottom part and a top part which can be moved with respect to the bottom part in the direction of motion of the bottom part. The top part serves as a telephone mount, and the bottom part has two guide slots which extend in the longitudinal direction of the vehicle along opposite vertical side parts. The slots receive laterally positioned guide elements projecting from the top part. In the use position region, the guide slots are curved upwardly in order to incline the accessory so that the top part of the carriage, which is guided in the slots by the guide elements, is moved from its operating position, in which it is parallel to the bottom part, into an ergonomically favorable oblique position which constitutes the use position.

This position can be further improved in terms of ergonomics if the guide slot on the side part of the receptacle which faces the user is longer than the guide slot in the side part which faces away from the user.

The receptacle has an electric motor which expediently pivots the receptacle out of the storage compartment and then displaces the bottom part and the top part of the carriage forwardly until the top part has reached its use position in one movement sequence. For the purpose of initiating the sequence, a switch may advantageously be arranged ergonomically at the free end of the armrest, on the user's side.

Finally, it is also expedient if the cover can be closed when the accessory is in the use position, so that its rests on the extension arm with the result that all that remains on the front side of the armrest is a slot for the extension arm. As a result, the armrest can be used as intended even when the accessory is in the extended position.

BRIEF DESCRIPTION OF THE DRAWINGS

Further objects and advantages of the invention will be apparent from a reading of the following description in conjunction with the accompanying drawings, in which:

FIG. 3 is a plan view of the embodiment of FIG. 1 with the telephone pivoted;

FIG. 4 is a rear view of the embodiment of FIG. 1 with the telephone pivoted and inclined;

DESCRIPTION OF PREFERRED EMBODIMENTS

Figure 1:
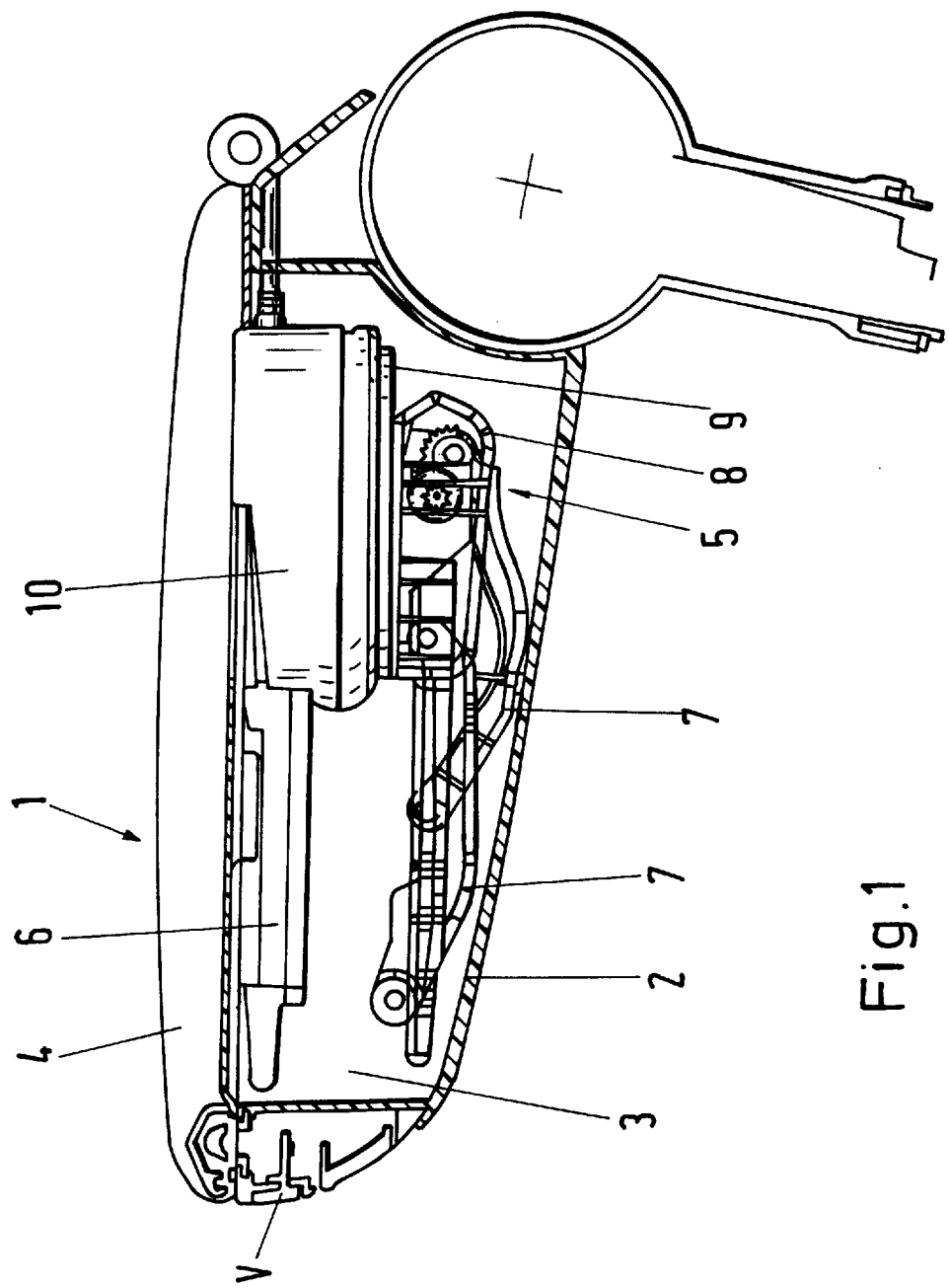
FIG. 1 side sectional view illustrating a representative embodiment of an armrest according to the invention with the telephone in the storage position.

In the typical embodiment of the invention shown in FIG. 1, an armrest 1 has an armrest body 2 with a storage compartment 3 and a closed cover 4 which is articulated on the armrest body 2 provides an armrest. A receptacle 5 holding a telephone 6, which can be used by the driver, is mounted in the storage compartment 3 of the armrest. The armrest 1 is mounted on a part of the vehicle body between the front seats of a passenger vehicle. The receptacle 5 is supported by four links 7 in the base region of the storage compartment 3, the links 7 being pivoted on the side walls of the compartment. In FIG. 1, the receptacle is located in a storage position, in the vicinity of the base. The four links 7 are arranged in two laterally spaced pairs, one behind the other in the longitudinal direction of the vehicle. As viewed in FIG. 1, the links 7 on the driver's side of the compartment are visible. The receptacle 5 has a base part 8 with a base plate 9, and the links 7 are pivotally connected to base plate 8. Arranged displaceably on the base plate 9 is a carriage 10 which serves as an extension arm and supports the telephone 6.

Figure 2:
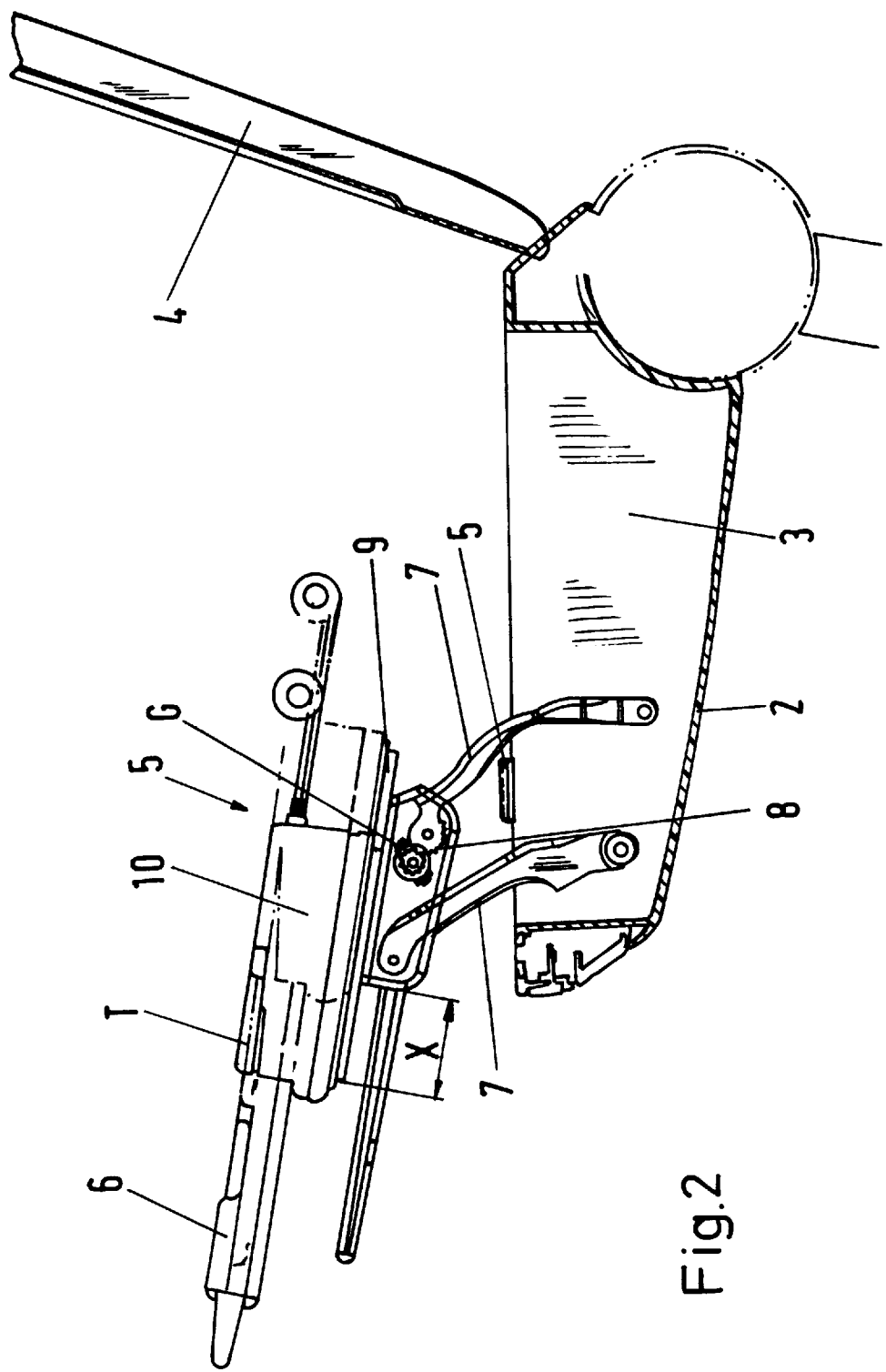
FIG. 2 is a similar view showing the armrest of FIG. 1 with the cover open and the telephone in the extended position.
Figure 6:
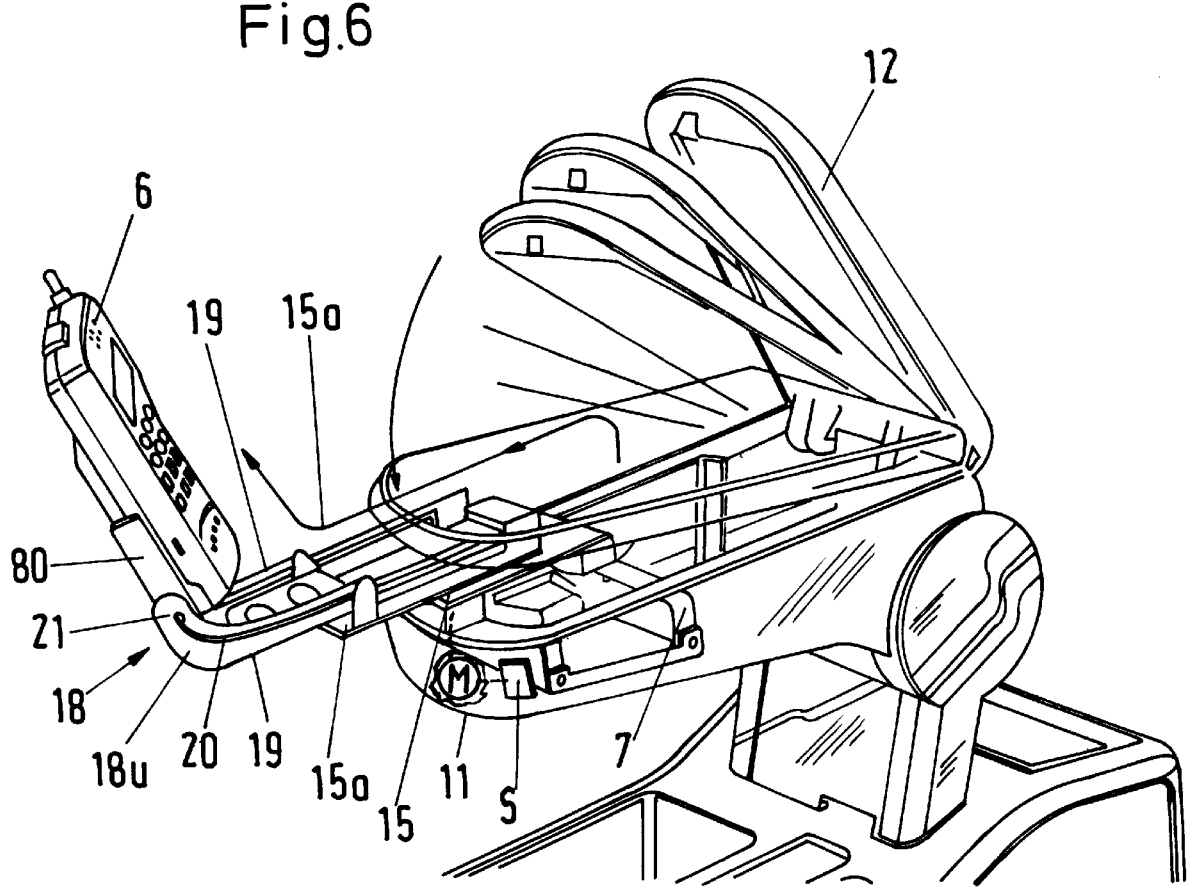
FIG. 6 is a perspective view of the embodiment shown in FIG. 5 with the telephone displaced in the use position.

FIG. 2 illustrates the armrest 1 with the cover 4 in the open position and the receptacle 5 pivoted out of the storage compartment 3 into an operating position. It can be seen that the four links 7 are of approximately equal length and are articulated approximately at the same distance apart from each other at both ends, resulting in the receptacle 5 having an operating position which is essentially parallel to its storage position. A drive device for the receptacle 5 is accommodated in the base part 8 and interacts with the links 7 which are at the rear with respect to the longitudinal direction of the vehicle. An electric motor used as the drive device is shown in FIG. 6. Furthermore you can see a gear device G on the rear links 7 by which those links can be pivoted, together with the receptacle 5, and a motor switch S, which is accessible when the cover 4 is open. In FIG. 2 the carriage 10 is illustrated as having been displaced forwardly on the base plate 9 by a distance X. This position does not quite correspond to the use position. Rather, it is an intermediate position into which the carriage 10 in this embodiment is displaced by the electric motor, once the operating position of the receptacle 5 has been reached. In this position, the carriage 10 is connected to the base plate 9 of the receptacle 5 by a pivot bearing (not illustrated) which has a compression spring on the bearing pin. The carriage 10 is urged in the clockwise direction, in plan view, by the compression spring and is retained in the position parallel to the storage compartment by a locking mechanism (likewise not illustrated). Upon unlocking by way of a button T, the compression spring pivots the carriage 10 by an angle α in the clockwise direction as far as a stop (see FIG. 3) and, at the same time, inclines the carriage by an angle β toward the driver (see FIG. 4).

In order to use the telephone 6, which is accommodated in the storage position in the closed armrest 1, the driver first presses a latch release button V for the cover 4 and opens the cover. He then presses the switch S, which is now accessible, to actuate the electric motor which elevates the receptacle 5, along with the telephone 6, into the operating position above the armrest body 2 and moves the carriage 10 forwardly by the distance X. After this, the driver presses a button T on the carriage, and the compression spring of the pivot bearing moves the carriage by the angle α in the clockwise direction and inclines it upwardly by the angle β, so as to move it into a use position which is favorable for operation by the driver. The actuation of the operating buttons V, S and T does not require any particular attention on the part of the driver since these operating buttons are placed within easy reach of the driver.

Figure 5:
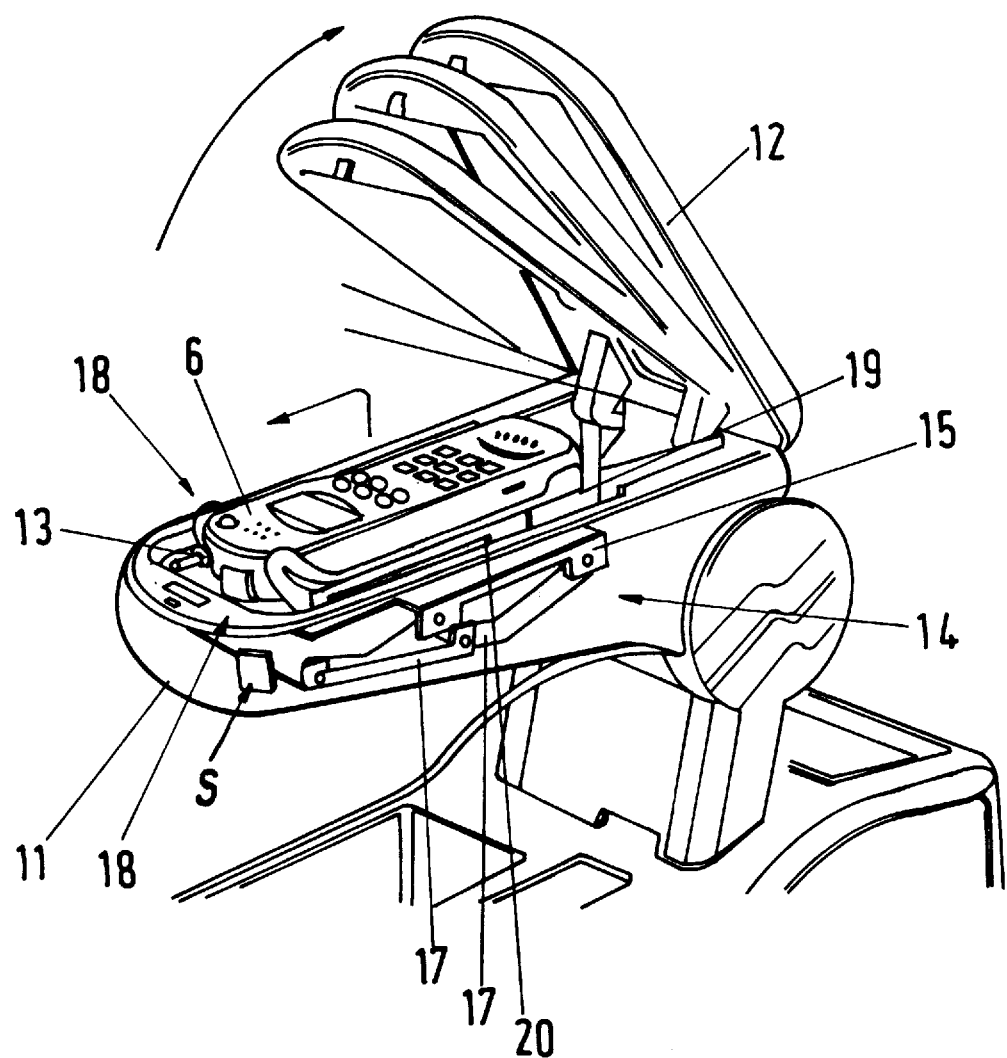
FIG. 5 a perspective view showing another representative embodiment of an armrest according to the invention, with the cover open and a telephone in the storage position.
Figure 7:
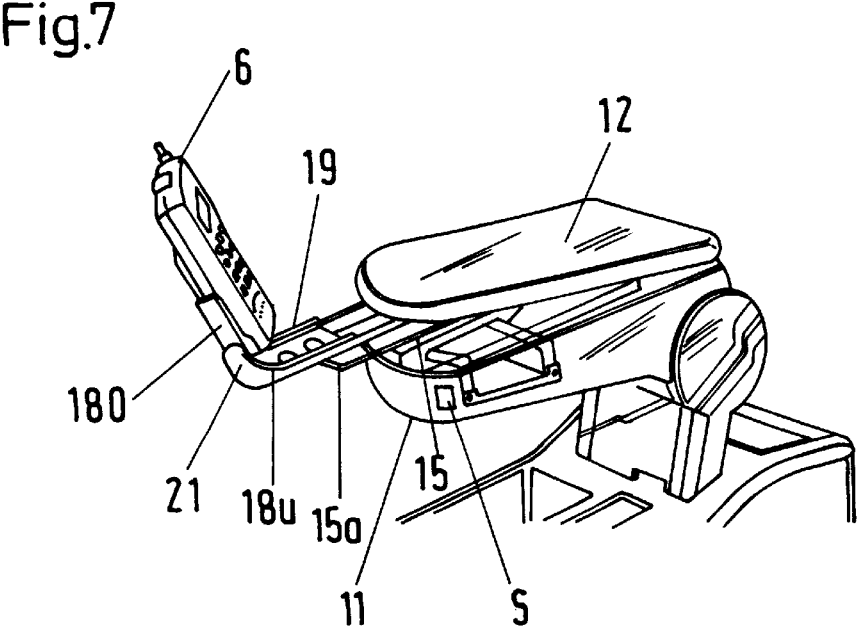
FIG. 7 is a perspective view of the embodiment of FIGS. 5 and 6 showing the armrest with the telephone in the use position and the cover resting in a closed position.

In the further exemplary embodiment illustrated in FIG. 5–7, the extension arm is configured differently from that of the embodiment described above. In this case, an armrest 11 has a storage compartment 13 which can be closed by a cover 12 and in which there is a receptacle 14 which can be actuated by an electric motor. A carriage 18 is displaceably supported on a base plate 15 of the receptacle which is supported by four links 17 in the base region of the storage compartment 13. As shown in FIG. 6, the carriage 18 includes a bottom part 18u and a top part 18o. The bottom part 18u is mounted on the base plate 15 by lateral guide elements in vertical side-wall regions 15a of the base plate 15 so that it can be displaced. Moreover, on mutually opposite, vertical side-wall regions 19 of the carriage the bottom part 18u has guide slots 20 which are engaged by guide webs 21 (see FIG. 6) of rectangular cross-section arranged laterally on the top part 18o. These guide slots and guide webs prevent the top part 18o from pivoting into an inclined position with respect to the bottom part 18u. At their ends, the guide slots 20 are curved upwardly so that the top part 18u, on which the telephone 6 is secured, can be moved by the guide webs 21 into an inclined position. In this embodiment the guide slot 20 of the bottom part 18u on the driver's side is somewhat longer than the guide slot on the side which faces away from the driver, but the two slots have the same curvature. As a result, the top part 18o, in addition to being inclined, is pivoted toward the driver so that the telephone 6 is in a use position, with respect to the driver, which is very advantageous in terms of ergonomics, as can be seen clearly from FIG. 6.

In this use position, the cover 12 can be closed so that its rests on the bottom part 18u as shown in FIG. 7, with the result that the armrest can be used as a support when the telephone is being used.

In the exemplary embodiment of FIGS. 5–7 the drive mechanism which includes an electric motor (not illustrated) and a gear mechanism like that of the embodiment of FIGS. 1–4 is actuated by a switch S after the cover 12 has been opened. The receptacle 14 is then pivoted into the operating position, above the storage compartment 13, and, thereafter, first of all the bottom part 18u, and then the top part 18o, is displaced into the use position, which is illustrated in FIGS. 6 and 7.

Although the invention has been described herein with reference to specific embodiments, many modifications and variations therein will readily occur to those skilled in the art. Accordingly, all such variations and modifications are included within the intended scope of the invention.

We claim:

1. An armrest for a motor-vehicle seat comprising:
    an armrest body having a storage compartment;
    a cover providing an arm support which is articulated on the armrest body
    a receptacle in the storage compartment for holding an accessory,
    a mechanism for moving the receptacle;
    a plurality of links pivotally connected to a base region of the storage compartment and to the receptacle so that, when the cover is open, the receptacle can be pivoted by the links between a storage position in the vicinity of the base region and an operating position above the armrest body;
    the links being arranged so that the operating position and the storage position of the receptacle are in essentially parallel planes; and
    an extension arm by which the accessory can be moved into a predetermined use position.

2. An armrest according to claim 1 including an electric motor for moving the receptacle into the operating position and the extension arm into the use position.

3. An armrest according to claim 2 including a switch on the armrest body.

4. An armrest according to claim 1 wherein the plurality of links comprises two pairs of links arranged one behind the other in the longitudinal direction of the motor-vehicle seat and the receptacle includes a base plate which is pivotally connected to the two pairs of links.

5. An armrest according to claim 4 wherein the extension arm comprises a carriage which is guided on the base plate.

6. An armrest according to claim 5 including means for moving the carriage forward with respect to the receptacle into a use position when the receptacle is in the operating position and for turning and moving the carriage into an inclined position.

7. An armrest according to claim 6 wherein the carriage has a pivot bearing with a compression spring on a pivot bearing pin to move the carriage into the use position.

8. An armrest according to claim 7 wherein the carriage is prestressed by the compression spring toward the use position by a locking mechanism so that, after unlocking the locking mechanism, the carriage can be moved into the use position by the compression spring.

9. An armrest according to claim 5 wherein the carriage includes a bottom part and a top part which can be moved with respect to said bottom part and the bottom part has two guide slots in vertical side-wall regions which extend in the longitudinal direction of the motor-vehicle seat and guide elements in the top part which are received in the guide slots so that the guide slots support the top part upright in the use position.

10. An armrest according to claim 9 wherein the armrest body and the cover are shaped to permit the cover to be closed so that it rests on the bottom part when the accessory is in the use position.

11. An armrest according to claim 9 wherein one of the guide slots is longer than the other guide slot.

12. An armrest according to claim 9 including an electric motor for moving the receptacle, displacing the bottom part and moving the top part from the storage position into the use position in one movement operation.

13. An armrest according to claim 12 including a switch on a free end of the armrest facing away from the articulation of the cover for actuating the electric motor.

* * * * *

UNITED STATES PATENT AND TRADEMARK OFFICE
CERTIFICATE OF CORRECTION

PATENT NO.    : 5,853,220
DATED         : December 29, 1998
INVENTOR(S)   : Gulich et al.

It is certified that error appears in the above-identified patent and that said Letters Patent is hereby corrected as shown below:

Title Page of patent, Column 1, [56] References Cited, U.S. PATENT DOCUMENTS:
"5,375,805 12/1994 Sudale et al." should read -- 5,375,805 12/1994 Sudak et al. --.

Signed and Sealed this

Third Day of July, 2001

Attest:

*Nicholas P. Godici*

NICHOLAS P. GODICI
*Acting Director of the United States Patent and Trademark Office*

*Attesting Officer*